(12) United States Patent
Hubbs

(10) Patent No.: US 8,337,980 B2
(45) Date of Patent: Dec. 25, 2012

(54) SILICONE-IMPREGNATED FOAM PRODUCT AND METHOD FOR PRODUCING SAME

(76) Inventor: Charlie Hubbs, Dalton, GA (US)

( * ) Notice: Subject to any disclaimer, the term of this patent is extended or adjusted under 35 U.S.C. 154(b) by 406 days.

(21) Appl. No.: 11/920,681

(22) PCT Filed: May 19, 2006

(86) PCT No.: PCT/US2006/019604
§ 371 (c)(1),
(2), (4) Date: Nov. 19, 2007

(87) PCT Pub. No.: WO2006/127533
PCT Pub. Date: Nov. 30, 2006

(65) Prior Publication Data
US 2009/0047495 A1    Feb. 19, 2009

(51) Int. Cl.
*B32B 5/18* (2006.01)
*B05D 1/18* (2006.01)
*B32B 37/12* (2006.01)

(52) U.S. Cl. ............... 428/308.4; 428/319.3; 428/315.5; 428/315.7; 428/319.7; 428/317.1; 427/443; 156/281

(58) Field of Classification Search ............... 428/319.3, 428/319.7, 319.9, 315.5, 315.7, 306.6, 308.4; 427/443; 156/281
See application file for complete search history.

(56) References Cited

U.S. PATENT DOCUMENTS

| | | | | |
|---|---|---|---|---|
| 3,171,820 | A | * | 3/1965 | Volz ............................ 521/61 |
| 3,894,165 | A | * | 7/1975 | Bates .......................... 427/244 |
| 4,298,416 | A | * | 11/1981 | Casson et al. ................ 156/87 |
| 4,978,415 | A | | 12/1990 | Jones |
| 5,114,773 | A | | 5/1992 | Bogdany |
| 5,853,481 | A | * | 12/1998 | Williamitis et al. ......... 118/679 |
| 6,083,602 | A | * | 7/2000 | Caldwell et al. ............. 428/77 |
| 2002/0088396 | A1 | * | 7/2002 | Caldwell et al. ............. 118/663 |

* cited by examiner

*Primary Examiner* — Hai Vo
(74) *Attorney, Agent, or Firm* — Chambliss, Bahner & Stophel, P.C.

(57) ABSTRACT

The present invention relates to products having a foam carrier or substrate, and particularly to such products employing a reticulated polyurethane foam carrier impregnated with silicone polymer. The present invention also relates to a method of producing these silicone-impregnated foam products.

26 Claims, 2 Drawing Sheets

SILICONE-IMPREGNATED FOAM PRODUCT AND METHOD FOR PRODUCING SAME

CROSS REFERENCE TO RELATED APPLICATIONS

This application discloses subject matter common to U.S. Provisional Patent Application Ser. No. 60/682,824, filed May 20, 2005. This application claims the benefit of that filing date.

BACKGROUND OF THE INVENTION

1. Field of the Invention

The present invention relates to products having a foam carrier or substrate, and particularly to such products employing a reticulated polyurethane foam carrier impregnated with silicone polymer. The present invention also relates to a method of producing these silicone-impregnated foam products.

This application herein expressly incorporates by reference the entire disclosure present in U.S. Pat. Nos. 4,957,798 and 5,114,773.

2. Description of Related Art

As noted in the above-cited patents, one of the previous advances in the plastics industry was the development of polyurethane foams which are cellular plastic materials generally formed by the reaction of long chain polyol compounds and organic polyisocyanates. Cellular plastics are available in various degrees of rigidity, ranging from soft, flexible foams useful in cushioning, clothing interliners, rug underlays, sponges and bath mats; semi-rigid foams, useful particularly as crash pads; and rigid foams for structural and insulation purposes. The final properties of the urethane foams depend principally on the choice of polyethers, polyesters or other long chain polyhydroxyl compounds which are converted by the polyisocyanate into a high molecular weight polymer which is then foamed by a suitable foaming system, usually a reaction of water with the free isocyanate content of the polymer, resulting in the formation of carbon dioxide which expands the resin into the desired cellular plastic. The control of branching in the reactants permits an extremely wide range of properties in the final foamed plastic. The density of the foam is controlled to a great extent by the amount of water employed. The configuration of the cell depends principally on the equivalent weight of the long chain polyhydroxyl materials favoring the production of a closed cell structure and the higher equivalent weight polyhydroxyl materials leading to the open-cell structure. The degree of branching of the polyhydroxyl reactant also influences the cell character.

The flexible and semi-rigid foams are processed for the aforementioned applications in a manner such that the foam has a low density, usually from about 1.25 to 4 pounds per cubic foot, and preferably as low a density as is consistent with the provision of a product of adequate strength, etc. Moreover, such flexible and semi-rigid foams should have an open-celled structure for most applications, which is to say that essentially all (i.e., at least about 90 percent), of the cells are intercommunicating since such a foam configuration is essential to the realization of acceptable foams for cushioning, clothing interliners, crash pads or the like. Rigid foams, in contradistinction, may have varying density values ranging up to 30 pounds per cubic foot or higher, and usually have a closed cell structure.

For various applications, however, it is often desired to utilize polymer materials other than polyurethanes, to obtain performance characteristics not provided by or obtainable from polyurethane itself. Unfortunately, however, many other polymer systems do not lend themselves readily to being formed into open-cell, resilient structures. Silicone polymers are highly desirable for use as products that will come into contact with the human body, as silicone is substantially inert or non-reactive with the skin. In the health care market, such products would be desirable for paddings for beds or other pieces of furniture, and other resilient products that are designed to come into contact with the body. Silicone polymers are not readily susceptible of being formed into open-cell resilient structures, such as sheets of foamed material.

SUMMARY OF THE INVENTION

Reticulated polyurethane foam materials are a type of open-cell foam product that are produced using heat and pressure, for example, by igniting gases in a chamber, to form flexible skeletal foam structures with no cell membranes. Reticulated polyurethane foam materials are generally available commercially from a number of sources. The open-pore foam can be produced in various pore sizes with void volumes as high as 98% and 200 $ft^2$ per cubic foot.

It is therefore a principal object of the present invention to provide an improved impregnated foam product having different or improved performance properties (material properties, physical properties) over unimpregnated low-density polyurethane foams, over other foamed polymers, and over other impregnated foam products.

The above and other objects of the present invention are realized by providing an impregnated foam product in which a polyurethane foam substrate, preferably an open-cell, reticulated substrate, is partially or fully impregnated with a silicone polymer which is cured after impregnation to produce a foam-based, substantially open-cell structure having desirable characteristics due to the presence of the silicone polymer impregnant. The polyurethane foam substrate may be either a polyether or a polyester product.

The present invention also provides a method of making an impregnated foam product comprising substantially partially or fully, and uniformly, impregnating a substrate of reticulated or non-reticulated open-cell, resilient foam material with a curable silicone polymer, curing the silicone polymer, and forming the product into a final shape. The process may preferably involve the use of a reverse roll applicator to impregnate the foam substrate. The method and product form may further preferably be in a layer form having a predetermined thickness.

The method may also include deforming a substrate layer, for example, compressing the substrate layer to reduce its thickness, as the silicone polymer is cured, to produce a layer product having varied mechanical and physical properties.

The polyurethane substrate is employed to control or set the gauge (thickness) of the product, and to provide tensile strength in the finished product. The silicone polymer impregnant imparts certain highly desirable characteristics to the product, making the product suitable for a variety of end uses.

Curable silicone polymers suitable for use in the present invention will generally be able to withstand temperatures in a range of −50° F. to +300° F. These silicone polymers will have very low smoke emission in the event that the product is burned, and offgases will have no or very low toxicity. Indoor air quality numbers for the product are excellent, as well. Mineral and/or chemical additives may be added to the silicone polymer to further make the final product ignition resistant. These properties of the finished product make the product potentially highly suitable for use in the aviation, aerospace, and military industries, among others.

The presence of silicone in the silicone-impregnated foam substrate will make the impregnated product mildew-resistant, and will prevent the growth of fungus or mold on the product. Such attributes make the product suitable for use in the health care and cosmetic industries, for example. Silicone polymers also afford excellent protection from UV light.

The product may be produced to be either highly resilient or rigid (effectively no resiliency), or to have a resiliency in between the two extremes. This can generally be achieved through selection of a specific type of silicone polymer to be used as the impregnant, as well as through the amount of impregnant employed per unit of volume of foam substrate, the degree of penetration of the impregnant into the foam substrate, and through the curing process for the silicone polymer.

It is envisioned that a particularly suitable form of the silicone-impregnated foam product will be a resilient layer product, such as may be used as a padding or cushioning layer. For example, the resilient layer form of the product is seen as being especially useful as a cushioned insole for footwear, due to its physical or mechanical properties, as well as the resistance to fungus, mold and mildew formation. Essentially the same characteristics make the product a candidate for use in the furniture industry, for example, as a foam pad or padding layer in upholstered products, a seat cushion, and/or as a top layer in a mattress construction.

DETAILED DESCRIPTION OF THE PREFERRED EMBODIMENTS

Figure 1:
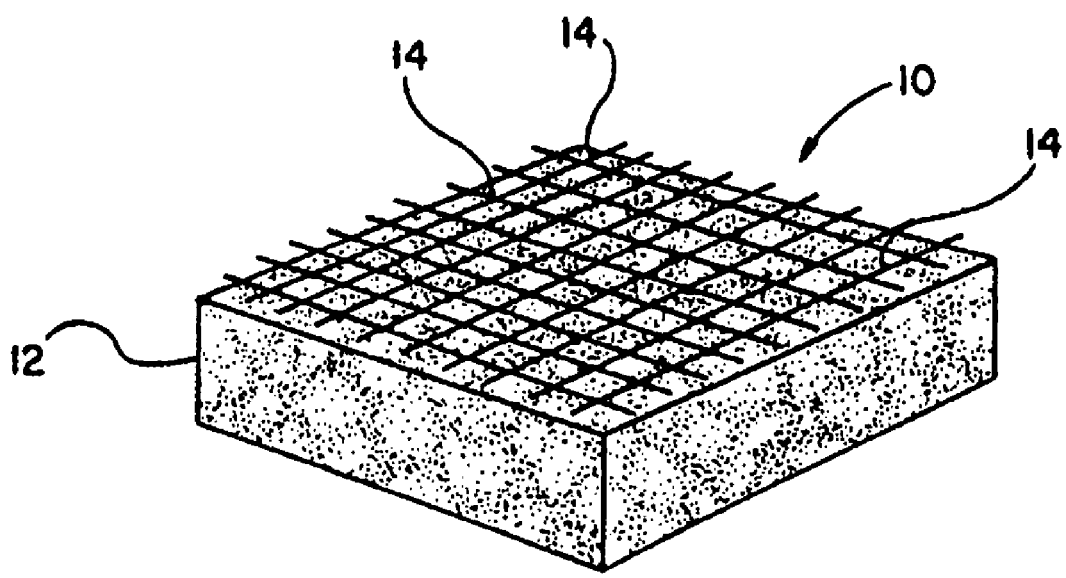
FIG. 1 is an elevational view of a silicone-impregnated foam product in accordance with the present invention, in the form of a resilient layer product.

Referring to FIG. 1, a resilient layer silicone-impregnated foam product according a preferred embodiment of the present invention is indicated generally at numeral 10. Foam product 10 preferably comprises a carrier layer or base foam material 12 which is preferably a low-density, open-celled, reticulated polyurethane foam (either polyester or polyether). FIG. 1 also illustrates that the resilient product of the invention may have a substrate 14, e.g., a backing material, adhered thereto, either by a separate adhesive material, or by curing the impregnant around both the carrier layer and the substrate.

The base foam material 12 is impregnated with an uncured silicone polymer in flowable form, preferably by using a reverse roll applicator, in a method which is described in detail in U.S. Pat. Nos. 4,957,798 and 5,114,773, which are incorporated herein by reference. The silicone polymer is preferably provided in a flowable form, in order that a substantially complete impregnation or distribution throughout the base foam material may be achieved, if desired.

Figure 2:
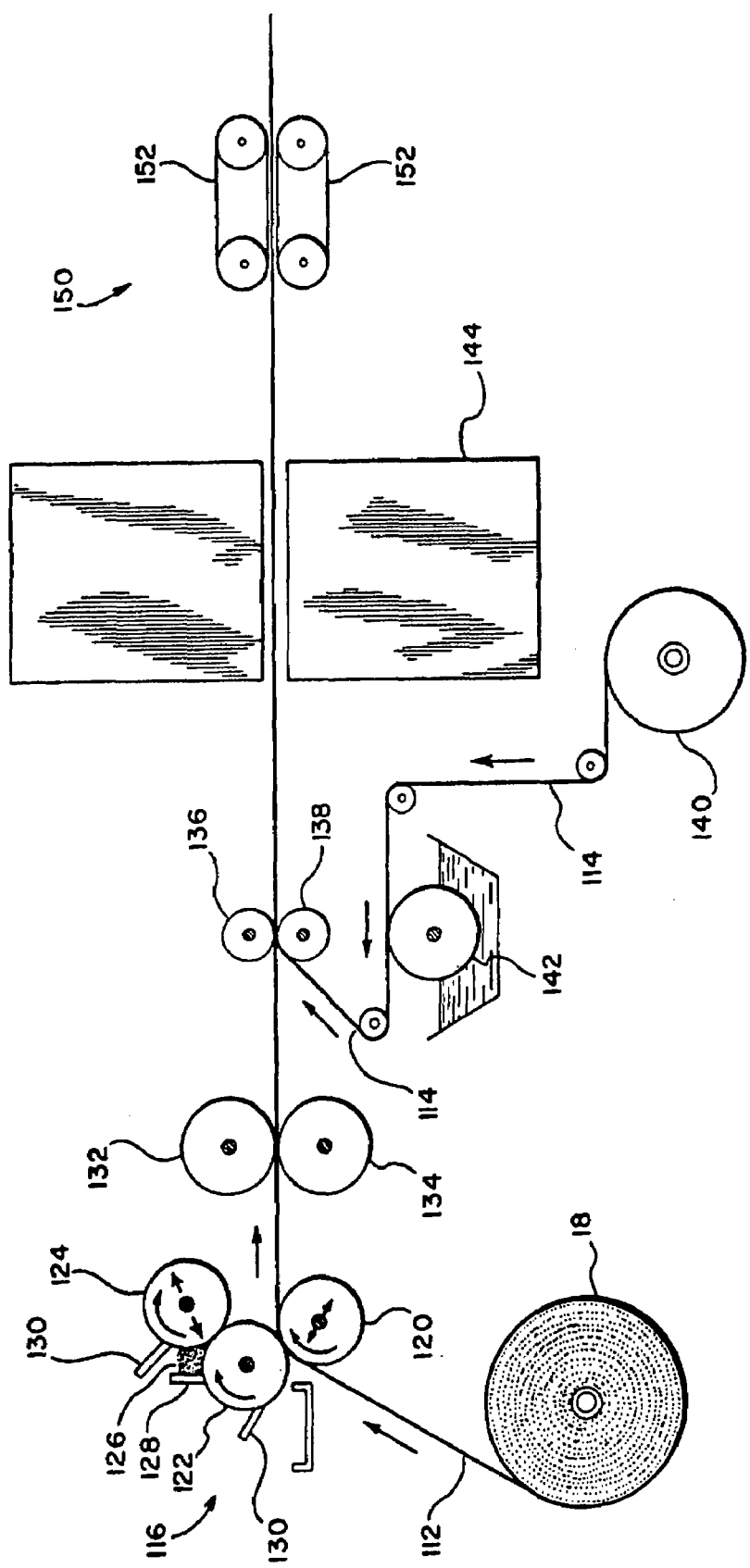
FIG. 2 is a substantially schematic view of an apparatus that may be employed in carrying out the method of the invention in a preferred embodiment thereof.

FIG. 2 is a substantially diagrammatic representation of an apparatus 116 that is suitable for carrying out the process, and for producing a product, in accordance with the present invention. The desired impregnant 126, i.e., a silicone polymer is preferably applied using a reverse-roll applicator. Various other methods of applying the silicone impregnant to the foam carrier may be employed with substantially equal effectiveness. The reticulated, open-celled polyurethane foam base material 112 is fed from a roll 118 over rubber backing roll 120. Transfer roll 122 and metering roll 124 coact to load transfer roll 122 with a predetermined amount of the silicone impregnant 126 from coating dam 128, the silicone impregnant being applied to the polyurethane foam 112 as the foam passes through a nip between transfer roll 122 and rubber backing roll 120. Both transfer roll 122 and metering roll 124 are provided with doctor blades 130, which act to prevent excessive buildup of the impregnant 126 on the rolls. The coating dam 128, and transfer and metering rolls may employ means for more evenly distributing the silicone across the width of the polyurethane foam carrier layer. The arrows included in FIG. 2 are provided to show the direction of travel of the sheets and rollers.

After the impregnant 126 has been applied to the polyurethane foam material, the sheet 112 may be passed between a pair of squeeze rolls 132, 134 which temporarily compress the foam and force the impregnant to fully penetrate and impregnate the entire thickness of foam sheet 112. The foam sheet may then optionally be passed between a pair of laminating rolls 136, 138, at which point a laminate substrate 114 is contacted with the foam sheet on one surface thereof.

The laminate substrate 114 is itself fed from a roll 140, preferably across an adhesive applicator roll 142, and brought into contact with a lower surface of impregnated foam sheet 112 at laminating rolls 136, 138. The foam sheet and substrate are pressed together between rolls 136 and 138, and the impregnant 126, which has preferably not completely dried or cured, is pressed between the fibers of the substrate, thereby coating the fibers as well.

It should be noted that, although the process is described as including the application of adhesive to the substrate prior to contacting the foam sheet material, the impregnant itself may provide sufficient bonding between the foam and the substrate for certain substrates and for certain anticipated uses. In these instances, the application of the adhesive to the substrate may be omitted.

It should also be noted that the padding structure may be produced having a substrate adhered to both the upper and lower surfaces, as will be evident to those skilled in the art upon reading the present specification. Further, the padding material may be produced without having any substrate adhered thereto, in which case the portions of the apparatus employed in applying the substrate may be either idled or omitted from the apparatus entirely.

Optionally, when it is desired to produce a finished product that is of a lesser thickness that that of the initial layer of foam material, the impregnated foam sheet material may be crushed or compressed during at least a final portion of the drying or curing of the impregnant 126, such that the resulting composite open-cell foam product is of a reduced thickness as compared with the original thickness of the foam carrier 112. When the reduced thickness is not desired, the product is simply transported while the impregnant is cured, and then taken up on a roll (not shown), or further processed, as by cutting into sheet form.

The thickness reduction is accomplished by first passing the impregnated foam carrier through a heater 144, and subsequently passing the foam carrier through thickness reduction means 150, depicted in FIG. 2 as a pair of endless belt assemblies 152 disposed on opposite sides of the foam carrier 112, and spaced apart at a predetermined distance substantially equal to the desired thickness of the final padding material to be produced. It is possible to use alternate means for compressing the impregnated foam, for example, using one or more pairs of squeeze knips similar to laminate rolls 136, 138. Each endless belt assembly 152 may preferably comprises at least a first and a second roll, having an endless belt extending around the rolls. At least one of the rolls of each belt assembly will preferably be powered or driven, for example by a drive motor, in a manner well known in the art. The facing surfaces of the belts are spaced apart at a predetermined desired distance, which distance is preferably adjustable by using suitable adjustment means disposed on the apparatus, the spacing distance between the belts being substantially equal to the desired end thickness of the padding material produced in accordance with this embodiment of the invention.

After the foam carrier 112 has been saturated or impregnated with the impregnant 126, in the case where the silicone impregnant is a heat curable silicone, the foam carrier is heated, as for example, by heater 144, which may be an air-circulating oven. The temperature to which the foam carrier/impregnant will be heated may vary depending upon the specific silicone employed as the impregnant. In the case where the silicone impregnant is an RTV silicone, no heater need be provided, or, if present, may be idled. All that is required in that case is that the foam carrier travel a sufficient length of time after being impregnated to allow the silicone to cure or vulcanize.

In the case where a reduced thickness product is desired, upon partial curing of the impregnant, the foam carrier/impregnant is introduced into the thickness reduction means 150, to crush or compress the foam carrier to a desired final thickness. The foam carrier is preferably maintained in a compressed state until the impregnant is substantially fully cured. The cured impregnant serves to freeze the finished product at substantially the thickness to which the foam carrier/impregnant was reduced in the thickness reduction means.

The foam structure which is the end product of this method preferably remains open-celled, in that the foam carrier is preferably not crushed or compressed to the extent that the impregnant completely fills all of the voids in the open cells of the foam carrier as the finished product would lose some if not all of its resiliency at that point. Instead, compression or crushing of the foam carrier will preferably produce an end product having a thicker "coating" of the impregnant on the cell walls of the foam carrier than would the product which is cured in an uncompressed state. The range of crushing or compressing of the foam carrier into an end product, set forth as a percentage of the original foam carrier thickness, may be from about 10% to 90%, and a preferred range will be from about 25% to 75%. The original thickness of the polyurethane foam carrier 112 may be any desired thickness up to about four inches, and even thicker assuming substantially complete impregnation through the thickness of the material can be achieved.

Another parameter meriting consideration in practicing the method for producing a compressed open-cell foam structure having the mechanical and physical properties of the impregnant, as opposed to the polyurethane foam carrier, is the weight ratio of the material "added on" to the foam carrier with respect to the total weight of the end product. In this preferred embodiment, the add-on material preferably constitutes from about 15% to about 99% of the total weight.

The composite open-cell structure produced by this method may advantageously be used as a padding material, with the amount of resiliency optionally being controlled to some extent by the percentage reduction in thickness of the structure from the original thickness of the foam carrier. Properties such as resiliency may be varied without changing the composition of the impregnant by instead changing the amount by which the thickness of the structure is reduced. The composite open-cell foam structure will have various uses, as previously mentioned, but the product will generally fall into the category of cushioning products.

Various types of silicone polymers are believed to be suitable for use in impregnating the foam substrate in order to form the product of the present invention. Silicone rubbers and other types of potentially suitable silicone polymers are discussed and described in a publication titled, "SILICONE-Fields of Application and Technological Trends", published by Shin-Etsu Chemical Co., Ltd. The silicone polymers suitable for use in the present invention are preferably curable at or near room temperature, commonly referred to as RTV (room temperature vulcanizable) silicones, although heat-curing silicones are also candidates for use. It is further envisioned that the silicone polymers suitable for use in the invention will be commercially available ones, and should not require custom production. For the particular process and apparatus that is described and illustrated herein, it is preferred that the uncured silicone have a viscosity in the range of about 5,000 cP/mPa*s to about 120,000 cP/mPa*s, and even more preferably in the range of about 8,000 cP/mPa*s to about 70-80,000 cP/mPa*s. It is further desirable in certain process operations to have the viscosity of the silicone at the lower end of this preferred range, for example, in the range of about 10,000 cP/mPa*s to about 12,000 cP/mPa*s. The use of a silicone polymer in this range of viscosities will help to ensure that the polymer is evenly distributed on the substrate, and that it will have sufficient flowability to be able to fully impregnate the substrate through its entire thickness.

The level of silicone polymer loading (quantity as a function of volume of polyurethane foam material), as well as the degree of impregnation (partial or full impregnation), may be selected in order to obtain the desired product characteristics, depending upon the intended end use of the product.

Examples of desired product characteristics include that the product may desirably have a thickness of from about 2 mm, in the case of the use of the product in footwear as a cushioning material, to about 4-6 inches, in the case that the product is produced to function as a mattress for a bed. It is also envisioned that products having thicknesses within this range would be suitable for use as mattress pads that are employed on top of a regular mattress, and other varied uses.

The finished density of the product may preferably range from approximately 3 lbs./ft.$^3$ to about 50 lbs./ft.$^3$. The density of the product can be modified to have an effect on the resiliency of the product, as well as on the durability of the product, and other desired product properties.

Preprocessing of the polyurethane foam, as by washing the foam with vinegar, may aid in the reduction of adverse reactions between the foam material and the curing silicone product. Certain types of silicone cross-linking agents, such as peroxide and tin based agents, may also improve the compatibility of the curing and cured silicone and the polyurethane foam. It will be understood by those skilled in the art that the particular silicone polymer selected may also depend upon the properties desired in the final composite structure and application to which it is to be put.

As noted previously, various additives may be introduced into the uncured, flowable silicone polymer, in order to obtain further desired material properties in the product of the present invention. It is envisioned, for example, that alumina trihydrate will be used as an additive to the uncured silicone in situations where improved flame retardancy of the final product is desired. In addition, suitable conventional fillers, coloring agents, curing agents, or other adjuvants may be incorporated in the silicone polymer composition prior to impregnation.

The foam base material 12 may thus be considered to be a substrate or carrier for the silicone polymer, providing a matrix or structure around which the silicone may be cured into final form. The finished product will have essentially the material and physical properties of the silicone polymer, while being in the form of a foamed layer or product. This yields a product simulating a silicone foam product without actually having foamed the silicone material.

Potential uses for the product of the present invention exist in the medical, health care, retail, cosmetic, aerospace, military, and furniture markets.

What is claimed is:

1. A resilient composite structure comprising:
a carrier layer of reticulated, open-cell, resilient polyurethane foam material, said resilient polyurethane foam material being substantially completely and uniformly impregnated with an impregnant comprising a curable silicone polymer; the impregnant being cured into a substantially elastomeric solid after said impregnation to produce a highly-durable, foamed, open-cell resilient composite structure wherein the impregnant partially coats the cell walls of the open cells of said carrier layer of resilient polyurethane foam material;
wherein said impregnant, prior to curing, has a viscosity in the range of about 5,000 cP/mPa's to about 120,000 cP/mPa's; and
wherein said structure, after said silicone polymer is cured, is of a thickness that is less than an initial thickness of said carrier layer.

2. The resilient composite structure as defined in claim 1 wherein said carrier layer has a thickness in the range of about 80 to 650 mils.

3. The resilient composite structure as defined in claim 1 wherein said carrier layer has an initial density of less than about 1.5 pounds per cubic foot.

4. The resilient composite structure as defined in claim 1 wherein said impregnant, prior to curing, has a viscosity in the range of about 8,000 cP/mPa's to about 80,000 cP/mPa's.

5. The resilient composite structure as defined in claim 4 wherein said impregnant, prior to curing, has a viscosity in the range of about 10,000 cP/mPa's to about 12,000 cP/mPa's.

6. The resilient composite structure as defined in claim 1 further comprising a substrate securely adhered to said impregnated foam material, said substrate extending completely across at least one surface thereof.

7. The resilient composite structure as defined in claim 6 wherein said substrate is adhered to said impregnated foam material by an adhesive, said adhesive being a component independent of said impregnant.

8. The resilient composite structure as defined in claim 1 wherein said structure has a thickness in a range between about 2 mm and about 6 inches.

9. The resilient composite structure as defined in claim 1 wherein the impregnant further comprises a cross-linking agent.

10. The resilient composite structure as defined in claim 9 wherein the cross-linking agent comprises peroxide.

11. The resilient composite structure as defined in claim 9 wherein the cross-linking agent comprises tin.

12. The resilient composite structure as defined in claim 1 wherein the impregnant comprises a flame retardant.

13. The resilient composite structure as defined in claim 12 wherein the flame retardant comprises alumina trihydrate.

14. The resilient composite structure as defined in claim 1 wherein the impregnant is adapted to be cured at room temperature.

15. The resilient composite structure as defined in claim 1 wherein the impregnant comprises a room temperature vulcanizable silicone polymer.

16. The resilient composite structure as defined in claim 1 wherein the impregnant is adapted to be cured by a heater.

17. The resilient composite structure as defined in claim 1 wherein the impregnant comprises a heat curable silicone polymer.

18. The resilient composite structure as defined in claim 1 wherein the impregnant substantially completely coats the cell walls of the open cells of the resilient polyurethane foam material.

19. A method for producing a resilient composite structure comprising:
applying, onto a carrier layer of reticulated, open-cell, resilient polyurethane form material, a silicone polymer substantially completely and uniformly impregnating said carrier layer with said silicone polymer; and
curing said silicone polymer to produce a foamed, open-cell resilient composite structure wherein the silicone polymer partially coats the cell walls of the open cells of said carrier layer of resilient polyurethane foam material,
wherein the composite structure exhibits properties of the silicone polymer;
wherein said silicone polymer impregnant, prior to curing, has a viscosity in the range of about 5,000 cP/mPa's to about 120,000 cP/mPa's; and
wherein said composite structure, after said silicone polymer is cured, is of a thickness that is less than an initial thickness of said carrier layer.

20. The method as defined in claim 19 wherein said carrier layer has an initial density of less than about 1.5 pounds per cubic foot.

21. The method as defined in claim 19 wherein said impregnant, prior to curing, has a viscosity in the range of about 8,000 cP/mPa's to about 80,000 cP/mPa's.

22. The method as defined in claim 21 wherein said impregnant, prior to curing, has a viscosity in the range of about 10,000 cP/mPa's to about 12000 cP/mPa's.

23. The method as defined in claim 19 further comprising a substrate securely adhered to said impregnated foam material, said substrate extending completely across at least one surface thereof.

24. The method as defined in claim 23 wherein said substrate is adhered to said foam material by an adhesive, said adhesive being a component independent of said impregnant.

25. The method as defined in claim 19 wherein said composite structure has a density in the range of about 3 to about 50 lbs/ft$^3$.

26. The method as defined in claim 19 wherein said composite structure has a thickness in the range of 2 mm to 6 inches.

* * * * *